United States Patent [19] [11] Patent Number: 4,501,856
Harpell et al. [45] Date of Patent: Feb. 26, 1985

[54] COMPOSITE CONTAINING POLYOLEFIN FIBER AND POLYOLEFIN POLYMER MATRIX

[75] Inventors: Gary A. Harpell, Morristown; Sheldon Kavesh, Whippany; Igor Palley, Madison; Dusan C. Prevorsek, Morristown, all of N.J.

[73] Assignee: Allied Corporation, Morris Township, Morris County, N.J.

[21] Appl. No.: 359,974

[22] Filed: Mar. 19, 1982

[51] Int. Cl.³ .................... C08L 23/06; C08L 23/12
[52] U.S. Cl. .................... 525/240; 428/290; 428/911; 525/88
[58] Field of Search .......................... 525/240

[56] References Cited

U.S. PATENT DOCUMENTS 4,344,908  8/1982  Smith et al. .................. 264/203
4,413,110 11/1983  Kavesh et al. ............... 526/348

FOREIGN PATENT DOCUMENTS 64167   4/1982  European Pat. Off. .
2051667 1/1981  United Kingdom .

OTHER PUBLICATIONS

Mead et al.–"The Preparation and Tensile Properties of Polyethylene Composites"—Jour. of App. Poly. Sci.–vol. 22, pp. 3249–3265, (1978).
Smook et al.–"Influence of Spinning . . . on the Tensile Strength of Porous High Mol. Wgt. Polyethylene" Polymer Bulletin, pp. 775–783, (1980).
Smith and Lemstra, "Ultra-High-Strength Polyethylene Filaments by Solution Spinning/Drawing", J. Mat. Sci., vol. 15, (1980), pp. 505–514.

Primary Examiner—Carman J. Seccuro
Attorney, Agent, or Firm—Alan M. Doernberg; Gerhard H. Fuchs

[57] ABSTRACT

A composite containing a network of ultrahigh molecular weight polyethylene or polypropylene fibers of high tenacity and modulus and a matrix which has ethylene or propylene crystallinity, e.g. polyethylene, polypropylene or copolymers. The composite can be formed by heating the matrix to its melting or sticking temperature around the fibers. The composite retains a high proportion of the tenacity of the fiber.

15 Claims, No Drawings

COMPOSITE CONTAINING POLYOLEFIN FIBER AND POLYOLEFIN POLYMER MATRIX

DESCRIPTION

This application is related to four copending, commonly assigned applications filed herewith, each of which is incorporated herein by reference to the extent not inconsistent herewith:

Kavesh et al., "Producing High Tenacity, High Modulus Crystalline Thermoplastic Article Such As Fiber or Film," Ser. No. 359,020, filed Mar. 19, 1982, a continuation-in-part of abandoned Ser. No. 259,266, filed Apr. 30, 1981;

Kavesh et al., "High Tenacity, High Modulus Polyethylene and Polypropylene Fibers, And Gel Fiber Useful In The Protection Thereof," Ser. No. 359,019, filed Mar. 19, 1982 (now U.S. Pat. No. 4,413,110 (1983)), a continuation-in-part of abandoned Ser. No. 259,266, filed Apr. 30, 1981;

Harpell et al., "Improved Ballistic-Resistant Article," Ser. No. 359,975, filed Mar. 19, 1982 now U.S. Pat. No. 4,403,012 (1983);

Harpell et al., "Coated Extended Chain Polyolefin Fiber," Ser. No. 359,976, filed Mar. 19,1982.

BACKGROUND OF THE INVENTION

The present invention relates to improved composites of the type containing a fiber network and a polymer matrix, and especially to such composite materials wherein both the fiber and polymer are polyolefins.

Composite materials containing fibers and polymer matrix are frequently employed to increase the physical properties (e.g. tensile strength and modulus) of the polymer. Such materials may be in the form of sheets, films, molded objects of various shapes, stamped parts, shaped extrusions and pultrusions, foams and sandwich constructions. The fibers frequently employed are glass, graphite fibers, boron, aramids (wholly aromatic polyamides) and poly(ester terephthalate). While such fibers have excellent mechanical properties and high melting points and softening temperatures, composites prepared therefrom do not have a gain in properties that might be expected by the rule of mixtures. This reduction in gain may be attributable to weaknesses at the fiber-polymer interface or other factors.

Mead & Porter, J. Appl. Polymer Sci., vol. 22, pp. 3249–3265 (1978) report composites prepared from solid state extruded low molecular weight (58,000 or 18,400 number average molecular weight) polyethylene fibers and polyethylene matrices (both high and low density). In preparing the composites, bonding occurs at sufficient temperatures to bond the matrix to the fibers, which may also be sufficient to reduce the crystallinity or order of the fibers, at least at or near the fiber-matrix interface. FIG. 8 of the article presents the theoretical tensile strengths of the composites as a function of the volume fraction of the fiber. The actual results achieved were 0.025 GPa at 0.4 volume fraction fibers (about 50% of theory) and 0.062 GPa at 0.7 volume fraction fibers (about 65% of theory)

BRIEF DESCRIPTION OF THE INVENTION

The present invention includes improved composite structures comprising:

(a) a network of polyolefin fiber selected from the group consisting of polyethylene and polypropylene fiber having a weight average molecular weight of at least about 500,000, a tenacity of at least about 15 g/denier and a main melting point of at least about 140° C. for polyethylene fiber, and a tenacity of at least about 11 g/denier and a main melting point of at least about 168° C. for polypropylene fiber; and (b) a matrix comprising a polymer having polyethylene or polypropylene crystallinity with a melting or sticking point at least about 3° C. lower than the main melting point of the polyolefin fiber;

said composite structure having a tensile strength at least about 75% of the volume average tensile strength of the polyolefin fiber network and the polymer matrix.

DETAILED DESCRIPTION OF THE INVENTION

The composites of the present invention contain both a network of polyolefin fibers and a matrix of a polymer, which is preferably a polyolefin polymer. A variety of geometric forms of composites are contemplated for the present invention, depending in part upon the nature of the fiber network, the nature and intermediate form of the polymer matrix and the assembly technique for the composite chosen from among those commonly available.

The polyolefin fiber of which the fiber network is constructed may be any ultrahigh molecular weight polyethylene or polypropylene of the above specified properties. This polymer fiber may be spun from a solution as in U.S. Pat. No. 4,137,394 to Meihuzen et al., various publications by Pennings et al. such as Colloid and Polymer Sci., vol 257, pgs. 547–49 (1979) or in application U.S. patent application Ser. No. 225,288 of Kavesh et al. (Jan. 15, 1981), copending and commonly assigned, now U.S. Pat. No. 4,356,138 (1982). The fiber may also be spun as a gel as in various works by Smith and Lemstra such as J. Mat. Sci., vol. 15, pp. 505–14 (1980), various publications of Kalb et al., such as J. Pol. Sci., vol. 18, pp. 87, or in U.S. patent application Ser. No. 259,266 of Kavesh et al. (Apr. 30, 1981) and the continuation-in-part thereof Ser. No. 359,020, filed Mar. 19, 1982. Ser. No. 259,266 was copending and is now abandoned. Ser. No. 359,020 is copending.

In the case of polyethylene fibers, the molecular weight is at least about 500,000 and is preferably at least about 1,000,000. The tenacity of the fiber is at least 15 grams per denier, and is preferably at least about 25 grams per denier, and more preferably, at least about 30 grams per denier. The modulus of the fibers, as measured by an Instron tensile testing machine, is preferably at least about 500 grams per denier, more preferably at least about 750 grams per denier, even more preferably at least about 1000 g/denier and most preferably at least about 1600 or 2000 g/denier.

The melting point of the polyethylene fiber (measured at 10° C./min) is preferably between about 140° C. and about 151° C., especially when used in conjunction with polyethylene polymer for the matrix having a similarly measured melting point between about 108° C. and about 126° C.

The achievement of fibers of these properties is described in the above documents, and especially in the three copending applications of Kavesh et al.

The fiber network may contain such fibers in a completely parallel fashion, or in an arrangement with planar layers of parallel fibers superimposed on top of other layers of parallel fibers, with the fibers of adjacent layers not being parallel, but rather generally perpendicular or at other angles. Exemplary structures include layered arrangements with alternate layers generally perpendicular and arrangements with each fifth layer being parallel and intermediate layers being shifted by +45°, −45°, 90° relative to the first layer, but in any order. It is also contemplated that the fiber network may take the form of a woven structure, continuous oriented fiber mat, chopped mat, or random oriented fibers.

In a similar fashion, polypropylene fabric networks may be formed, with the above Ser. No. 259,266 and Ser. No. 359,020 disclosing in particular the preparation of polypropylene fibers of high molecular weight (at least about 750,000, preferably at least about 1,000,000) tenacity and modulus. In general, because of the lower crystallinity of polypropylene compared to polyethylene, polypropylene fibers with tenacities of at least about 11 grams per denier, and preferably at least about 13 grams per denier and modulus at least about 110 g/denier, and preferably at least about 200 g/denier are employed. While polypropylene fibers of generally lower tenacity and modulus values are used, the melting points of the polypropylene fibers are generally higher, with a representative melting point being at least about 168° C., preferably at least about 170° C. It will be appreciated that polypropylene fibers having these properties can be achieved only by procedures which cause a high degree of orientation.

The matrix polymer may be polyethylene, polypropylene or copolymers having polyethylene or polypropylene crystallinity. The term "polyethylene crystallinity" is intended to mean substantial regions in the polymer which appear similar on X-ray diffraction analysis to crystalline polyethylene. The term "polypropylene crystallinity" is intended to mean regions in the polymer which have an X-ray diffraction pattern similar to one or more of the crystalline forms of polypropylene (isotactic and syndiotactic). It will be appreciated that, for example, block copolymers of polyethylene and polypropylene will normally have regions both of polyethylene crystallinity and polypropylene crystallinity.

If the matrix polymer is polyethylene, then it may be any of the various known forms of polyethylene, including low density polyethylene (density of between 0.90 and 0.94 g/cm$^3$), high density (between 0.94 and 0.98 g/cm$^3$), linear low density or other conventional forms. If the matrix polymer is polypropylene then it may be any of the various forms such as atatic, isotactic or syndiotactic. If the matrix polymer is a polyethylene-polypropylene copolymer, then any ratio therebetween may be used, and the polymer may be random, block or graft. In the case of polyethylene-polypropylene copolymers, it is preferred that a matrix polymer be highest in that monomer which corresponds to the fiber network polymer, i.e. high in ethylene where the fiber network is polyethylene. When the matrix polymer is a copolymer of ethylene with other monomers, it is preferred that the other monomer be relatively minor in amounts, and, especially that the ethylene content be sufficiently high to impart ethylene crystallinity to the polymer, which crystallinity forms regions of at least 10% of the volume of the polymer. Common comonomers which can be present in a totally random binary copolymer, are higher olefins (e.g. butene-1, hexene-1), diolefins (e.g. 1,4-hexadiene), unsaturated acids (e.g. acrylic, methacrylic acid), alkyl acrylates (e.g. methyl acrylate), unsaturated esters (e.g. vinyl acetate), unsaturated alcohols (e.g. vinyl alcohol). As indicated on page 397 of Encyclopedia of Polymer Science, vol. 6 (Interscience Pub. 1967), there is linear relationship between vol. % vinyl acetate in an ethylene-vinyl acetate copolymer, with 20 vol. % vinyl acetate corresponding to approximately 10% crystallinity. Similar numbers can be derived or found for other common ethylene copolymers. It will be appreciated, however, that greater proportions of any of these monomers can be introduced if the copolymer is non-random, i.e. a block or graft copolymer. In similar fashion, random copolymers of polypropylene with other monomers such as olefins (e.g. butene-1 and hexene-1) and diolefins (e.g. 1,4-hexadiene) and graft copolymers with any of the above groups of comonomers may be employed.

The matrix generally occupies much, and preferably substantially all, of the void spaces left by the fiber network. It is contemplated, however, that some of these void spaces may also be taken by fillers, other reinforcements, and/or gas. Various techniques are contemplated to place the matrix polymer around or within the fiber network. One such technique is to coat each fiber, or some of the fibers, with matrix polymer, arrange the coated fibers into the desired network structure and then heat set the overall structure so as to cause the matrix polymer to flow and occupy the remaining void spaces. Another contemplated technique is to arrange layers or other structures of fiber adjacent and between various forms, e.g. films, of the matrix polymer and then to heat set the overall structure. In such a case, as well as in the case of coated fibers, it is possible that the matrix can be caused to stick or flow without completely melting. In general, however, if the matrix polymer is caused to melt, relatively little pressure is required to form the composite; while if the matrix polymer is only heated to a sticking point, generally more pressure is required. In general, however, the pressure and time to set the composite and to achieve optimal properties will depend on the nature of the matrix (chemical composition as well as molecular weight) and processing temperature.

In various forms of the present composites, the fiber network occupies different proportions of the total volume of the composite. In general, it is preferred that the fiber network comprise between about 0.1 and about 99 volume percent of the composite, more preferably between about 1 and about 95 volume percent, and most preferably between about 40 and about 90 volume percent, with the matrix occupying the remaining volume. It is more preferred, especially in the case of composites formed using films of the matrix polymer, that the fiber network occupy between about 40 and about 85 volume percent of the composite.

One salient feature of the composites of the present invention is the retension of tenacity value for the composite, compared to the fiber network. In general, theory indicates that a composite containing fibers, in which the fiber and the network have drastically different tenacity values, would have a volume average tenacity computed by multiplying the tenacity of the fiber times its volume proportion in the composite and adding that tenacity quantity to the tenacity of the matrix multiplied by its volume proportion. As indicated by the above Mead and Porter article, such theoretical values are rarely achieved, and in the case of polyethylene-polyethylene matrices, a value of 70 percent of theory was not achieved in the middle range of 40–70 volume percent fiber. In the composites of the present invention, it is a desired result that the strength of the composite structure be at least 75 percent of the volume average tenacity of the polyolefin fiber network and of the polymer matrix. In the case of composites with the polyolefin fibers arranged completely in a parallel fashion, it will be appreciated that the tenacity would ordinarily be measured in the direction of the fibers. In case of laminates, the theoretical strength in a particular direction is calculated on the base of fibre and matrix strengths, their moduli and Poisson's ratios, their volume fractions and number of plies and their orientation by making use of derived stress-strain relationships well-known in the art of composite materials. (See, for example, J. E. Ashton and J. M. Whitney, Theory of Laminated Plates, Technomic ® Publ. Co., Conn, 1970.)

Then the value of theoretical strength can be compared with the experimental result for a sample cut and tested in the direction. Since the polymer matrix has essentially no orientation, its tensile strength may be measured on an ordinary shaped article such as a plaque or a sheet, whichever structure is most readily available. Several examples of this type of computation are given in the examples.

EXAMPLES 1-3

The fibers used in the Examples 1-3 were prepared by the techniques of Kavesh et al, U.S. Ser. No. 259,266, starting with a 7% solution of an 17.5 dL/g intrinsic viscosity (measured in decalin at 135° C.) ultrahigh molecular weight polyethylene in paraffin oil.

The fibers were stretched at the temperatures and stretch ratios indicated in Table I, giving fibers with the tenacities (in g/denier), tensile modulus values (in g/denier), elongation values (in percent) and work-to-break values (in GJ/m$^3$) indicated in Table I. The denier of the xerogel fiber prior to stretching is also indicated.

TABLE I

| Fiber | Stretch Temp | Stretch Ratio | Denier | Ten. | Mod | Elong. | W to B |
|---|---|---|---|---|---|---|---|
| G | 145° C. | 17 | 665 | 22 | 760 | 4.2% | 9.5 |
| H | 144° C. | 13 | 976 | 15 | 520 | 5.8% | 10.1 |

Still stronger fibers (tenacities of 30, 35 or 40 g/denier or higher with still higher modulus values 1500 g/denier or 2000 g/denier or higher) are prepared in application Ser. No. 359,020, and may also be used in the present invention.

EXAMPLE 1

A 48 filament strand of extended chain polyethylene fibers, designated "G" in Table I, above, of 4.27 m length was divided into 21 pieces of 8 inches (20.32 cm) length each. The first 16 pieces were placed between two sheets of low density polyethylene film (20.32 cm×0.5 cm×0.07 mm) and molded under mild (2700 kPa) pressure at various temperatures (five at 102°-112° C., five at 115°-123° C. and six at 140° C.) for about ten minutes. The resulting sixteen composites and the five remaining fiber pieces were then tested in an Instron Tensile Testing Machine using a 5 inch (11.25 cm) gauge length at a 5 inch/min. (11.25 cm/min) pulling rate at room temperature.

The average (for 5-6 samples in each case) force at specimen failure (in pounds and Newtons) is indicated in Table II.

TABLE II

| Molding Temp. | Force at Specimen Failure Pounds | (N) | Ratio |
|---|---|---|---|
| 102-112 | 38.5 | (171.3) | 1.16 |
| 115-123 | 37.4 | (166.4) | 1.12 |
| 140 | 37.0 | (164.6) | 1.11 |
| Untreated Strand | 32.3 | (143.7) | — |

The contribution of the polyethylene coating or matrix was calculated as no more than one pound (4.45 N). By adding this contribution to the force of failure of untreated strand, we get theoretically estimated values for the force of failure of the composite. A "ratio" for the composite strength obtained to the strength theoretically estimated is also given in Table II. The ratio exceeds 1.0 in all three instances. The increase in composite (coated fiber) strength must be attributable to some favorable interaction, which overshadowed the loss of fiber crystallinity, if any, that occurred during molding.

EXAMPLE 2

A 48 filament strand of extended chain polyethylene fibers, designated "G" in Table 1 above, of 168 in. (4.27 m) length was divided into 21 pieces of 8 in (20.23 cm) length each. These pieces were tested on the Instron Tensile Testing Machine with a 5 inch (11.25 cm) gauge length and 5 inch/min. (11.25 cm/min) loading rate.

First 9 pieces were tested by pulling 3 strands simultaneously. These 3 strand tows failed at average force of 82 lbs. (364.9 N) (ultimate stress 1.57 GPa).

Four samples of composite consisting of 3 parallel strands molded between two layers of HDPE film 8 in. (20.3 cm)×0.7 cm×0.007 cm each were prepared. The samples failed at an average force of 89 lbs. (334 N) (ultimate stress 1.66 GPa).

When the contribution of the matrix 3 lbs (13.35 N) (obtained from testing of neat matrix) is added to the failure force of 3 strand fiber samples, the ratio of the composite strength to the theoretically expected is 1.05.

This example illustrates that the higher melting higher density polyethylene matrix (coating) also had a favorable interaction with the extended chain polyethylene fibers.

EXAMPLE 3

Transverse Properties

A series of coated fibers, labeled "H" in Table I, were prepared as in Examples 1 and 2; and two comparative materials were prepared: one substituting KEYLAR ®-29 aramid fibers (simulating defects in structure) for the extended chain polyethylene fibers, the other molding test pieces of similar size out of high density polyethylene only. The three sets were then tested in the Instron Tensile Tester (in the transverse direction for the two composites). The polyethylene "B"/polyethylene composite failed at an average of 23 pounds (102.3 N), the aramid/polyethylene composite failed at 14.2 pounds (63.2 N) and the same polyethylene failed at 22 pounds (97.9 N).

The conclusion is that, upon molding, the composites of extended chain polyethylene fibers with high density polyethylene matrix obtain the transverse strength of the matrix, even though the extended chain polyethylene fibers, themselves, had essentially no transverse strength.

Preparation of Gel Fiber

A high molecular weight linear polyethylene (intrinsic viscosity of 18 in decalin at 135° C.) was dissolved in paraffin oil at 220° C. to produce a 6 wt. % solution. This solution was extruded through a sixteen-hole die (hole diameter 1 mm) at the rate of 3.2 m/minute. The oil was extracted from the fiber with trichlorotrifluoroethane (trademark Genetron ® 113) and then the fiber was subsequently dried. One or more of the multifilament yarns were stretched simultaneously to the desired stretch ratio in a 100 cm tube at 145° C. Details of sample stretching are given in Table III, along with selected fiber properties.

TABLE III

| Fiber | Example | Stretch Ratio | Denier | Tenacity g/den | Modulus g/den | U.E. % |
|---|---|---|---|---|---|---|
| A | 1 | 12 | 1156 | 11.9 | 400 | 5.4 |
| B* | 1,2 | 18 | 1125 | 9.4 | 400 | 4.0 |
| C | 3,4 | 13 | 976 | 15.0 | 521 | 5.8 |
| D | 5 | 17 | 673 | 21.8 | 877 | 4.0 |
| E | 6 | 15 | 456 | 21.6 | 936 | 3.9 |
| F | 7 | 18 | 136 | 27.6 | 1143 | 4.1 |

*Fiber B apparently retained some oil after extraction, thus accounting for its inferior properties compared to Fiber F.

EXAMPLES 4–9

High density polyethylene film (PAXON ®4100 high density polyethylene, an ethylene-hexene-1 copolymer having a high load melt index of 10 made and sold by Allied Corporation) was placed on both sides of a three inch by three inch (6.75 cm × 6.75 cm) steel plate and then layers of parallel multistrand yarn of high tenacity polyethylene yarn (as described below) were wound around the plate and film until the film on both sides was covered with parallel fibers. Film was then again placed on both sides and the yarn was wound in a direction perpendicular to the first layer. The process was repeated with alternating film and fiber layers, and with adjacent fiber layers being perpendicular to each other until the supply of fibers was exhausted or a fiber content of 7 g for each side has achieved. The wound plate was then molded under pressure for 30 minutes at 130°–140° C. The sample was then removed and slit around the edges to produce an A and B sample of identical fiber type and areal density.

The above procedure was followed six times with the fibers indicated in Table IV. For Example 4, 37.4 weight % of the fibers used were as indicated by the line 4-1 and 62.6 weight % of the fibers were as indicated by the line 4-2.

TABLE IV

| Example | Fiber Tenacity (g/denier) | Fiber Modulus (g/denier) | UE* | Fiber Wt | Wt % Fiber |
|---|---|---|---|---|---|
| 4-1 | 16.3 | 671 | 4.6% | 7.425 g | 75.2 |
| 4-2 | 9.5 | 400 | 4.0% | | |
| 5 | 9.5 | 400 | 4.0% | 5.333 g | 74.6 |
| 6 | 15.0 | 521 | 5.8% | 7.456 g | 75.5 |
| 7 | 15.0 | 521 | 5.8% | 7.307 g | 76.4 |
| 8 | 21.8 | 877 | 4.0% | 7.182 g | 74.7 |
| 9 | 21.6 | 936 | 3.9% | 7.353 g | 76.6 |

Bullet fragments of 22 caliber projectile (Type 2) meeting the specifications of Military Specification MIL-P-46593A (ORD) were shot at each of the composites at an approximate velocity of 347 m/sec using the geometry of:

| G | A | B | T | C | D |
|---|---|---|---|---|---|
| 5 feet | 3 feet | 3 feet | 1.5 feet | 3 feet | |
| 1.52 m | 0.91 m | 0.91 m | 0.46 m | 0.91 m | | where G represents the end of the gun barrel; A, B, C and D represent four lumiline screens and T represents the center of the target plaque. Velocities before and after impact were computed from flight times A-B and C-D. In all cases, the point of penetration through screen C indicated no deviation in flight path. The difference in these kinetic energies of the fragment before and after penetration of the composite was then divided by the following areal densities of fibers to calculate an energy loss in $J/(kg/m^2)$:

| Example | Fibral Areal Density $(kg/m^2)$ |
|---|---|
| 4 | 1.28 |
| 5 | 0.92 |
| 6 | 1.28 |
| 7 | 1.26 |
| 8 | 1.24 |
| 9 | 1.27 |

TABLE V

| Ex. | Run | Tenacity (g/denier) | Velocity (m/sec) before/after | Kinetic Energy (J) before after | Loss $[J/(kg/m^2)]$ |
|---|---|---|---|---|---|
| 4 | A | 12.0 | 337.7/282.2 | 62.8–42.9 | 14.8 |
| 4 | B | 12.0 | 346.3/298.7 | 66.0–49.1 | 13.2 |
| 5 | A | 9.5 | 346.9/317.0 | 66.3–55.3 | 11.9 |
| 5 | B | 9.5 | 335.0/304.8 | 61.8–51.2 | 11.6 |
| 6 | A | 15.0 | 386.2/287.1 | 82.1–45.4* | 28.7 |
| 6 | B | 15.0 | 335.0/277.4 | 61.8–42.4 | 15.2 |
| 7 | A | 15.0 | 333.1/274.9 | 61.1–41.6 | 15.5 |
| 7 | B | 15.0 | 335.3/277.7 | 61.9–42.5 | 15.4 |
| 8 | A | 21.8 | 353.0/287.1 | 68.6–45.4 | 18.7 |
| 8 | B | 21.8 | 343.2/277.1 | 64.9–42.3 | 18.2 |
| 9 | A | 21.8 | 343.8/247.8 | 65.1–33.8 | 24.6 |
| 9 | B | 21.8 | 337.4/249.0 | 62.7–34.2 | 22.5 |

*Note the unusually high initial velocity for Example 6, Run A.

Plotting the energy loss versus fiber tenacity shows a positive correlation, with the relationship being fairly linear, except for low values for both composites of Example 8 (which may have experienced fiber melting during molding).

EXAMPLE 10

The procedure of Examples 4–9 was repeated using a 26.5 g/denier fiber, except that only a single pair of composites was prepared. Then the two composites were molded together using a film of low density polyethylene between them. This composite had 68% fibers and a fiber areal density of 1.31 $kg/m^2$. On firing, the velocities before and after impact were 1143 ft/sec and 749 ft/sec (348.4 and 228.3 m/sec). The kinetic energies before and after impact were 66.9 J and 28.7 J. The energy loss based on 1.31 $kg/m^2$ fiber areal density was then 29.1 $J/(kg/m^2)$, which, when plotted, falls on the line drawn through points from Examples 4–7 and 9.

COMPARATIVE EXAMPLE 11

Composites were prepared as in Examples 4–9 using a melt-spun polyethylene fiber having a tenacity of 5.6 g/denier. Some fiber melting occurred during molding due to the close melting points of the melt spun fiber and the high density polyethylene fiber. On firing a projectile the velocities measured before and after impact were 342.3 and 320.3 m/sec (1123 ft/sec and 1051 ft/sec), for energies before and after of 64.51 J and 56.5 J. The energy loss, based on a fibral areal density of 1.31 kg/m$^2$ is 6.35 J/(kg/m$^2$). substantially lower than the values for Examples 6–9 (being within the scope of the present invention), and lower even than values for Examples 4 and 5, where the fiber tenacity was under 15 g/denier.

Examples 12 and 13 and Comparative Example 14

EXAMPLE 12

A high tenacity polyethylene fiber (tenacity 18.4 g/denier, tensile modulus 673 g/denier) was coated with low density polyethylene from a toluene solution. The polyethylene (tradename Union Carbide PE-DPA 6169 NT) had a melt index of 6 and a density of 0.931 g/cm$^3$. The coated fibers were wound on a three inch by three inch (6.75 cm×6.75 cm) steel plate, with each layer wound perpendicular to the previous layer. The wound plate was molded for 30 minutes at 120°–130° C. The composite was then cut around the edges and the two halves molded together with a thin film of low density polyethylene in the center to obtain a single plaque having 86.6 weight % fiber content. Ballistics testing of this plaque is described below.

EXAMPLE 13

Example 12 was repeated using a high tenacity polyethylene fiber (tenacity 19.0 g/denier, modulus 732 g/denier) coated with high density polyethylene (tradename EA-55-100, melt index=10, density 0.955 g/cm$^3$). After molding for 30 minutes at 130°–140° C., two composite plaques were produced (10A and 10B) each with 72.6 weight % fiber contact. Ballistic testing is described below.

COMPARATIVE EXAMPLE 14

For comparison, a 1500 denier KEVLAR® 29 aramid yarn (22 g/denier) woven roving fabric prepregged with phenolic polyvinyl butyral resin (resin content 20 weight %) was molded for 20 minutes at 166° C. Three such plaques (14A, 14B and 14C) were prepared with a fiber areal density of 1.04 kg/m$^2$ each.

Ballistic Testing 12–14

The six composites of Examples 12 and 13 and of Comparative Example 14 were taped over a 2.2 inch by 2.1 inch (5.6 cm×5.6 cm) cut in a three-eighths inch (1 cm) plywood sheet. Bullet fragments (.22 type 2) according to Military Specification MIL-P-46593A (ORD) were fired through the plaques using the geometry of:

| G | A | B | T | C | D |
|---|---|---|---|---|---|
| 5 feet | 3 feet | 3 feet | 1.5 feet | 3 feet | |
| 1.52 m | 0.91 m | 0.91 m | 0.46 m | 0.91 m | | where G represents the end of the gun barrel; A, B, C and D represent four lumiline screens and T represents the center of the target plaque. Velocities before and after impact were computed from flight times A-B and C-D. In all cases, the point of penetration through screen C indicated no deviation in flight path. The results are displayed in Table VI.

TABLE VI

| Composite | Areal Density kg/m$^2$ | Velocity (m/sec) Before | Velocity (m/sec) After | KE(J) Before | KE(J) After | Energy Loss [J(kg/m$^2$)] |
|---|---|---|---|---|---|---|
| 12 | 1.11 | 327.7 | 226.2 | 59.1 | 28.2 | 27.9 |
| 13A | 0.797 | 335.6 | 283.5 | 62.0 | 44.3 | 22.3 |
| 13B | 0.797 | 331.3 | 278.3 | 60.5 | 42.7 | 22.3 |
| 14A | 1.04 | 300.5 | 205.7 | 49.8 | 23.3 | 25.4 |
| 14B | 1.04 | 342.6 | 273.4 | 64.7 | 41.2 | 22.6 |
| 14C | 1.04 | 338.0 | 257.9 | 62.9 | 36.6 | 25.3 |
| controls | | 336.2 | 324.9 | 62.3 | 58.2 | — |
| (no composites) | | 337.7 | 327.4 | 62.8 | 59.0 | — |

These results indicate comparable performance for composites prepared from polyethylene fibers of 18.4–19.0 g/denier tenacity and composites prepared from aramid fibers of 22 g/denier. Since the process of Kavesh et al. can produce fibers of tenacity 30 g/denier, 40 g/denier or higher, it is expected that these fibers would substantially outperform aramid fibers for ballistic applications.

EXAMPLES 15–16

Four 16 filament polyethylene xerogels was prepared according to the procedure described above before Example 1, but with 16 spinnerettes. One of the yarns (having been prepared from a 22.6 IV polymer) was stretched using one end at 140° C. (18:1); the other three yarns were stretched together (48 filaments) at 140° C. (17:1). The properties of these two yarns were measured and are displayed in Table VII with published data on KEVLAR®-29 aramid yarn.

TABLE VII

| | 16 Fil | 48 Fil | KEVLAR-29 |
|---|---|---|---|
| Denier | 201 | 790 | 1043 |
| Tenacity (g/den) | 21 | 18 | 22 |
| Modulus (g/den) | 780 | 650 | 480 |
| Elongation | 3.9% | 4.7% | 3–4% |

An aluminum plate; three inches×three inches ×four-tenths inch (7.6 cm×7.6 cm×1 cm) was wound with one yarn, then covered with a 1.4 mil (0.036 mm) thick high density polyethylene film (Allied Corporation's 060-003), then wound in a perpendicular direction with yarn, then coated with film. After 10 fiber layers and 10 film layers were present on each side of the plate, the covered plate was cured at 136.6° C. for 15 minutes at 400 psi (2.76 MPa) pressure.

After molding, the composite ensemble was split around its edges to remove the aluminum plate. One of the 10 layer composites was retained for ballistic testing and the other was used as a central core for winding an additional 6 yarn/film layers to prepare a composite containing a total of 22 yarn layers (both 16 fil yarn and 48 fil yarn were used). The areal densities and the fiber areal densities of the 10 layer and 22 layer ECPE composites are given in Table VIII, below. The fiber volume fraction was about 75% in each.

Ballistics testing of these composites are described below.

EXAMPLE 17

A fourteen layer composite similar to the twenty-two layer composite of Example 16 was prepared by winding two fiber/film layers onto each side of a similar ten layer composite. The fourteen layer composite had a total areal density of 0.274 kg/m³ and fibral areal density of 0.167 kg/m³. The same 16 and 48 fiber yarn was used.

COMPARATIVE EXAMPLE 18

Composites of Kevlar-29 aramid and polyester resin were prepared in a similar manner except that the matrix polyester system was doctored onto each Kevlar layer to impregnate the ensemble. The polyester system was Vestopal-W plus 1% tertiary butyl perbenzoate and 0.5% cobalt napthenate. The ensembles were cured at 100±5° C., for one hour at approximately 400 PSI (2.76 MPa) pressure. The areal densities and fiber areal densities are given in Table VIII. The fiber volume fractions were 75%.

Ballistic Testing

Ballistic testing of the composites of Examples 15-17 and the Kevlar-29/polyester 3"×3" composite plaques of comparative Example 18 were performed in an identical manner. The plaques were placed against a backing material consisting of a polyethylene covered water-filled urethane foam block. The density of the backing material was 0.93 g/cm³ The ammunition fired was 22 caliber, longrifle, high velocity, solid nose, lead bullets. The rounds were fired from a handgun of six inch (15 cm) barrel length at a distance of six feet (1.8 m), impacting perpendicular to the plaque surface. Impact velocity was approximately 1150 ft/sec (353 m/sec) (Ref: "Gunners Bible", Doubleday and Co., Garden City, N.Y. 1965).

The qualitative results are displayed in Table VIII. In the column labeled "Penetration" the word "Yes" means that the bullet passed completely through the plaque; the word "No" means that the bullet was stopped within the plaque.

TABLE VIII

| Example | Layers | Composite Areal Density (g/cm³) | Fiber Areal Density (g/cm³) | Penetration |
|---|---|---|---|---|
| 12 | 10 | 0.122 | 0.097 | Yes |
| 13 | 22 | 0.367 | 0.248 | No |
| 14 | 14 | 0.274 | 0.167 | No |
| 15A | 7 | 0.131 | 0.097 | Yes |
| 15B | 12 | 0.225 | 0.167 | No |
| 15C | 18 | 0.360 | 0.256 | No |

These results indicate that the composites using polyethylene fibers may of 18-21 g/denier tenacity may required roughly the same areal density (0.167±0.05 g/cm³) as the aramid composite to defeat the 22 caliber projectile.

EXAMPLE 20

Mode of Failure

The bullet exit side of Example 10 was examined by scanning electron microscopy and found to have a fibrillar structure similar to that reported for Kevlar® fibers (Ballistic Materials and Penetration Mechanics—R. C. Laible—Elsevier Scientific Publishing Company—1980). Fibers exhibited extensive longitudinal splitting similar to that found when fibers were broken in an Instron Tensile Tester using a 10 inch (25.4 cm) length of fiber pulled at 10 in./min (25.4 cm/min). There was no evidence of the smooth knobs shown at the end of impacted polyester fibers shown in FIG. 6, Page 84—Ballistic Materials and Penetration Mechanics. (The knob-like structure at the end of the impacted polyester is attributed to melting).

Example 5B (see Table V) exhibited similar morphology after ballistic impact, but the fibrillation was less extensive, and there was evidence of a minor amount of melting.

We claim:
1. A composite structure comprising:
  (a) a network of polyolefin fibers selected from the group consisting of polyethylene and polypropylene fibers having a weight average molecular weight of at least about 500,000, a tenacity of at least about 15 g/denier and a main melting point of at least about 140° C. for polyethylene fiber, and a tenacity of at least about 11 g/denier and a main melting point of at least about 168° C. for polypropylene fiber; and
  (b) a matrix comprising a polymer having polyethylene or polypropylene crystallinity with a melting or sticking point at least 3° C. lower than the melting point of the polyolefin fiber;
  said composite structure having a tenacity at least 75% of the volume average tenacity of the polyolefin fiber network and the polymer matrix.

2. The composite structure of claim 1 comprising between about 5 and about 99 weight % polyolefin fiber network and between about 1 and about 95 weight % polymer matrix.

3. The composite structure of claim 1 or 2 wherein said polyolefin fiber is polyethylene fiber.

4. The composite structure of claim 3 wherein said polymer matrix is an ethylene copolymer.

5. The composite structure of claim 3 wherein said polymer matrix is polyethylene polymer.

6. The composite structure of claim 5 wherein said polyethylene polymer has a specific gravity of 0.90-0.94.

7. The composite structure of claim 5 wherein said polyethylene polymer has a specific gravity of 0.94-0.98.

8. The composite structure of claim 5 wherein said polyethylene fiber has a main melting point at 10° C./min between about 140° C. and about 151° C. and said polyethylene polymer has a melting point between about 108° C. and about 126° C.

9. The composite structure of claim 5 wherein said polyethylene polymer has a main melting point at 10° C./min between about 126° C. and about 136° C.

10. The composite structure of claim 5 having a tensile strength at least 90% of the volume average tenacity of the polyethylene fiber network and the polyethylene polymer matrix.

11. The composite structure of claim 5 wherein said polyethylene fiber has a weight average molecular weight of at least about 1,000,000 a tenacity of at least about 25 g/denier and a tensile modulus of at least about 750 g/denier.

12. The composite structure of claim 11 wherein said polyethylene fiber has a tenacity of at least about 30 g/denier and a tensile modulus of at least about 1000 g/denier.

13. The composite structure of claim 1 having about 0.1 to about 99 volume percent fiber network and about 99.9 to about 1 volume percent polymer matrix.

14. The composite structure of claim 13 having about 1 to about 95 volume percent fiber network.

15. The composite structure of claim 14 having about 40 to about 90 volume percent fiber network.

* * * * *